US011872577B2

(12) United States Patent
Adams

(10) Patent No.: US 11,872,577 B2
(45) Date of Patent: Jan. 16, 2024

(54) DEVICE AND METHOD FOR DISPENSING LIQUIDS IN GLASS CONTAINERS

(71) Applicant: Catherine E Adams, New Smryna Beach, FL (US)

(72) Inventor: Catherine E Adams, New Smryna Beach, FL (US)

( * ) Notice: Subject to any disclaimer, the term of this patent is extended or adjusted under 35 U.S.C. 154(b) by 0 days.

(21) Appl. No.: 17/740,687

(22) Filed: May 10, 2022

(65) Prior Publication Data

US 2022/0362792 A1 Nov. 17, 2022

Related U.S. Application Data

(60) Provisional application No. 63/186,968, filed on May 11, 2021.

(51) Int. Cl.
*B05B 11/00* (2023.01)
*B05B 11/10* (2023.01)

(52) U.S. Cl.
CPC ...... *B05B 11/1045* (2023.01); *B05B 11/1057* (2023.01)

(58) Field of Classification Search
CPC ............ B05B 11/1045; B05B 11/1057; B05B 11/1049; B05B 11/1011
See application file for complete search history.

(56) References Cited

U.S. PATENT DOCUMENTS 4,241,853 A * 12/1980 Pauls .................. B05B 11/1064 222/335
4,345,718 A * 8/1982 Horvath ................ B05B 1/3436 222/207
5,878,924 A * 3/1999 Johnson ............... B67D 7/0294 222/509
11,143,611 B2 * 10/2021 Furey ..................... G01N 27/07
2008/0015539 A1 * 1/2008 Pieroni ................. A61J 1/2096 604/403
2008/0105763 A1 * 5/2008 Fahy ................... B05B 11/1045 239/373
2011/0121102 A1 * 5/2011 Clarke .................. B05B 7/0408 239/581.1
2021/0162440 A1 * 6/2021 Lea ...................... B65D 83/201
2022/0362792 A1 * 11/2022 Adams ................ B05B 11/1045

FOREIGN PATENT DOCUMENTS

| | | | | | |
|---|---|---|---|---|---|
| CA | 2977635 | A1 | * | 2/2019 | ......... B05B 11/0008 |
| CN | 203354408 | | * | 12/2013 | |
| DE | 10023551 | A1 | * | 12/2001 | ......... B05B 11/0043 |
| ES | 2279878 | | * | 9/2007 | ............... B65D 1/04 |
| ES | 2282226 | | * | 10/2007 | |
| GB | 2501712 | A | * | 11/2013 | ........... B67D 7/0294 |
| WO | WO-2019041021 | A1 | * | 3/2019 | ......... B05B 11/0008 |

* cited by examiner

*Primary Examiner* — Bob Zadeh
(74) *Attorney, Agent, or Firm* — Law Office John R Nelson, PA; John R. Nelson

(57) ABSTRACT

The present invention is a device and method for dispensing liquids in glass containers. The invention can be used to spray liquids from non-threaded glass containers that do not typically otherwise have a mechanism for spraying. Furthermore, this allows the user of the liquid to use the original container and avoid transferring the liquid from the original container. An adapter is fitted into the neck of an appropriate glass container, such as an olive oil bottle, and a sprayer may be threaded onto the adapter.

11 Claims, 9 Drawing Sheets

DEVICE AND METHOD FOR DISPENSING LIQUIDS IN GLASS CONTAINERS

RELATED APPLICATIONS

This application claims priority to U.S. Provisional Patent Application No. 63/186,968 filed on May 11, 2021, which is incorporated herein by reference in its entirety, including any addendums, appendixes, and attachments thereto, to the extent the application does not conflict with the present disclosure herein.

BACKGROUND

The following discussion is not to be deemed admitted prior art but merely related art to show possible background and information related to dispensing liquids from glass containers.

Olive oil is a food that's internationally popular today and is used in a wide range of different recipes. Sometimes while cooking it is better to spray olive oil on the surface. For example, spraying droplets on a pan or on roasted vegetables as an alternative to pouring olive oil. Many people find olive oil more preferable to other cooking spray alternatives.

Consumers need a device that sprays or mists any liquid from its original container, no threading required.

Eliminating the need for consumers to switch containers, reduces waste and allows for a variety of cooking and cleaning applications. For example, spraying olive oil from its original bottle.

Consumers need to be able to insert a device into a neck of a glass container.

Currently, there are a number of solutions for dispensing liquids from containers via a sprayer. Some of these solutions attempt to allow spraying of any liquid by transferring containers, but these solutions fail to meet the needs of the industry because transferring liquids risks spills and in many cases loss of product, consumers would require multiple containers, generic spray containers require new identification labeling, and in addition all spray containers are not suitable for all types of liquids.

Other solutions attempt to pour liquids from the original container, but these solutions are similarly unable to meet the needs of the industry because the product is not dispersed in small droplets onto the required surface.

Still, other solutions seek to use a pressurized pump atomizer, but these solutions also fail to meet industry needs because a unique container is required and when pressure runs out the user must pump again to build pressure.

Still, other solutions use an adapter on the outside of the container neck to fit the threaded attachment of the spray apparatus but these fail to meet the needs of certain requirements because the bottle neck may not provide the friction requirements needed to hold the adapter attachment in place.

Each of these possible background solutions fails to meet the needed solution because they do not allow a user to use an existing glass container for the dispensing of liquids.

Therefore, a need exists for novel apparatus that is disposable or re-usable, easy-to-use, and low-cost for dispensing liquids from glass containers via a sprayer.

BRIEF SUMMARY OF THE INVENTION

The invention relates generally to dispensing liquids from glass containers via an adapter for a container.

Disclosed are numerous aspects of a unique and inventive device and method for dispensing liquids from a glass container.

This invention allows a consumer to use an existing, manufacturer provided, glass container to dispense contents.

It is desirable to have a liquid dispenser from a glass container that connects to a glass container or other non-threaded container using an adapter style attachment which allows users to benefit from the convenience of a spray apparatus in any container. Furthermore, it would be desirable avoid transferring the contents from the original container to a secondary container solely for the purpose of using a sprayer. Still, further, it would be desirable to also re-use the liquid dispenser. Still, further, it would also be desirable to have an easy to attach method that secures the sprayer in a plurality of original containers. Still, further, it would also be desirable to have an easy to attach method to speed attaching the sprayer to the original container while simultaneously securing the sprayer. Still, further, it would also be advantageous to have a liquid dispenser sprayer that could be manufactured and sold individually and separate from original containers.

The disclosed device advantageously fills these needs and addresses the aforementioned deficiencies by providing an adaptable liquid dispensing sprayer for a plurality of original containers.

The invention can be used to spray or mist any liquid directly from the container in which it is sold. Furthermore, it should be noted that as single use plastics become less desirable and try to work toward less consumption this allows consumers to utilize products in their existing containers in a more functional way.

BRIEF DESCRIPTION OF THE DRAWINGS

A device for dispensing liquids in glass containers is illustrated by way of example, and not by way of limitation, in the figures of the accompanying drawings.

While aspects of a device for dispensing liquids in glass containers will be described with reference to the details of the embodiments of the invention shown in the drawings (and some embodiments not shown in the drawings), these details are not intended to limit the scope of the invention.

LIST OF FIGURE ITEMS

Figure 1:
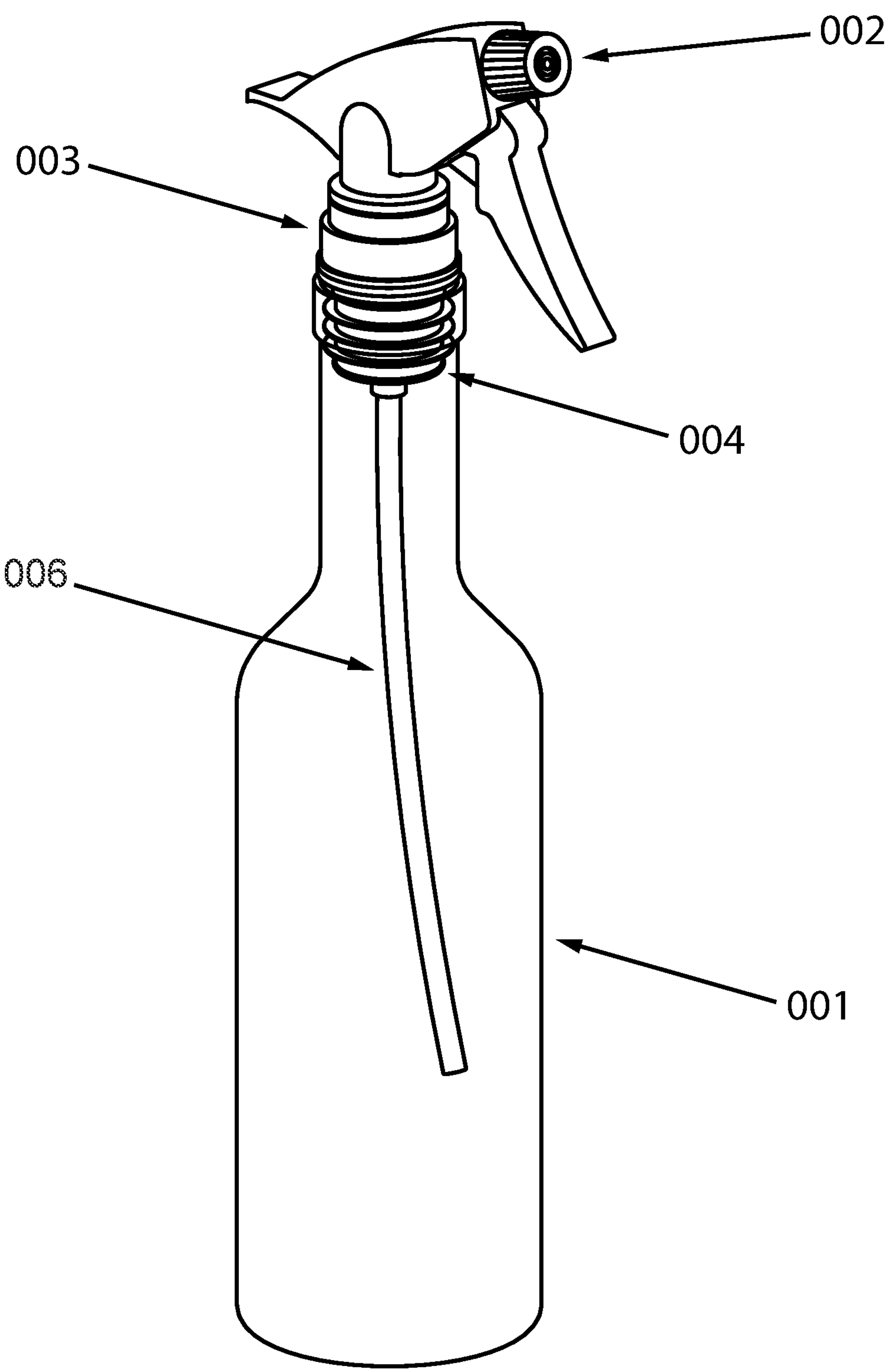
FIG. 1. A perspective view of an embodiment of a device for dispensing liquids in glass containers inserted in a typical glass container without a collar.

001 Container
002 Sprayer (of any type)
003 Container opening
004 Adapter
005 Collar
006 Dip tube
007 Dip tube hole
008 Upper member threads
009 Lower member threads

DETAILED DESCRIPTION

The order of the steps of disclosed processes may be altered within the scope of the invention.

This disclosure will now provide a more detailed and specific description that will refer to the accompanying drawings. The drawings and specific descriptions of the drawings, as well as any specific or alternative embodiments discussed, are intended to be read in conjunction with the entirety of this disclosure. A device for dispensing liquids in glass containers may, however, be embodied in many different forms and should not be construed as being limited to the embodiments set forth herein; rather, these embodiments are provided by way of illustration only and so that this disclosure will be thorough, complete and fully convey understanding to those skilled in the art.

For the purposes of promoting an understanding of the principles of the present invention, reference will now be made to the embodiments illustrated in the drawings and specific language will be used to describe the same, only as examples and not intended to be limiting.

Glass containers, as used herein may be, but are not limited to, bottles, bottles or containers, containers, containers without a threaded neck, containers with a threaded neck, polymer containers, plastic containers, a container to hold liquids, or more specifically olive oil containers.

Glass olive oil containers are typically 500 ml or 750 ml volumetrically. The outer diameter of the open of a glass olive oil container is typically 3 cm.

A device for dispensing liquids in glass containers is designed to allow droplet spraying of liquids from a non-threaded glass container.

Disclosed is a device for dispensing liquids in glass containers comprising: an adapter 004.

In some embodiments of a device for dispensing liquids in glass containers a container adapter in its most complete version comprising: (1) a spray apparatus 002; (2) an adapter 004; (3) a dip tube 006; and (4) a collar 005 or coupling that fits around the neck of the glass container.

These components, generally speaking, are configured as follows: (1) a trigger style spray apparatus 002 is connected to a (2) a malleable, ductile, flexible, soft, workable, supple, adapter 004; (3) a dip tube 006 passes through a hole 007 in the adapter 004 and connects to the spray apparatus 002; (4) a collar 005 attached to the trigger style spray 002 apparatus of a diameter larger than the container.

The disclosed apparatus is unique when compared with other known devices and solutions because it provides: (1) an apparatus to disperse droplets; (2) ease of use with different kinds of glass containers; (3) use and re-use, and (4) allows for utilization of original packaging.

The disclosed apparatus is unique in that it is structurally different from other known devices or solutions. More specifically, the apparatus is unique due to the presence of (1) an adapter 004 that does not require a threaded connection, (2) a container collar 005 that secures the components to a non-threaded container, (3) a single spray tap with pliable but sturdy interior adapter 004 that fits a variety of containers. An adapter 004 secures the apparatus to the container via the inside of the neck of the container.

In some embodiments of a device for dispensing liquids in glass containers, a spray trigger 002 apparatus may be, but not limited to, materials made of metal or plastic, and of a trigger, pump, or Flairosol® style.

In some embodiments of a device for dispensing liquids in glass containers an adapter 004, may be, but not limited to, a flexible molded material such as cork, plastic, silicone, rubber.

In some embodiments of a device for dispensing liquids in glass containers an adapter 004, may have sides that are smooth, finned, ridged, flared, or threaded.

In some embodiments of a device for dispensing liquids in glass containers an adapter 004 is of a height, not meant to be limiting, of 15 mm to 75 mm; a diameter not meant to be limiting, of 7 mm to 50 mm.

In some embodiments of a device for dispensing liquids in glass containers an adapter 004 has an upper member with a height, not meant to be limiting, of 5 mm to 35 mm; a diameter not meant to be limiting, of 7 mm to 50 mm that may be the same as the outside diameter of a container opening. Furthermore an adapter 004 has a lower member with a height, not to be limiting of 5 mm to 50 mm; a diameter not meant to be limiting, of 7 mm to 50 mm that may be the same as a container neck inner diameter.

In some embodiments of a device for dispensing liquids in glass containers an adapter 004 is substantially cylindrical, conical, tapered, cubical, or parallelepipedic.

In some embodiments of a device for dispensing liquids in glass containers an adapter 004 has an upper member with threads to receive a sprayer nozzle. Threads may be of a size, not meant to be limiting, according to standards recognized to those familiar in the art of 400, 410, 415, and 420.

In some embodiments of a device for dispensing liquids in glass containers a dip tube 006, may be, but not limited to, materials made of plastic, silicone, rubber, or metal.

In some embodiments of a device for dispensing liquids in glass containers a dip tube 006 is of a height, not meant to be limiting, of 25 mm to 275 mm; a diameter not meant to be limiting, of 2 mm to 12 mm.

In some embodiments of a device for dispensing liquids in glass containers a dip tube hole 007 is of a diameter not meant to be limiting, of 7 mm to 50 mm.

In some embodiments of a device for dispensing liquids in glass containers a collar 005, may be, but not limited to, materials made of plastic, rubber, metal, metal with another substance such as plastic, rubber or silicon on the inside portion of the collar.

In some embodiments of a device for dispensing liquids in glass containers the collar 005 may have a more decorative nature with logos, colors, or materials to identify the contents of the container.

In some embodiments of a device for dispensing liquids in glass containers the components may be connected by adhesives.

In some embodiments of a device for dispensing liquids in glass containers the components may be connected by snap-fit connections.

In some embodiments of a device for dispensing liquids in glass containers the components may be connected by couplings that allow various components to fit together and pivot. Still further embodiments may use clips to hold connections together.

In some embodiments of a device for dispensing liquids in glass containers may be an adapter 004 only.

FIG. 1. A perspective view of an embodiment of a device for dispensing liquids in glass containers inserted in a typical glass container 001 without a collar. A sprayer 002 is connected to an adapter 004; an adapter 004 is inserted into the neck of a glass container 001; a dip tube 006 passes through an adapter 004 and is connected to a sprayer 002.

Figure 2:
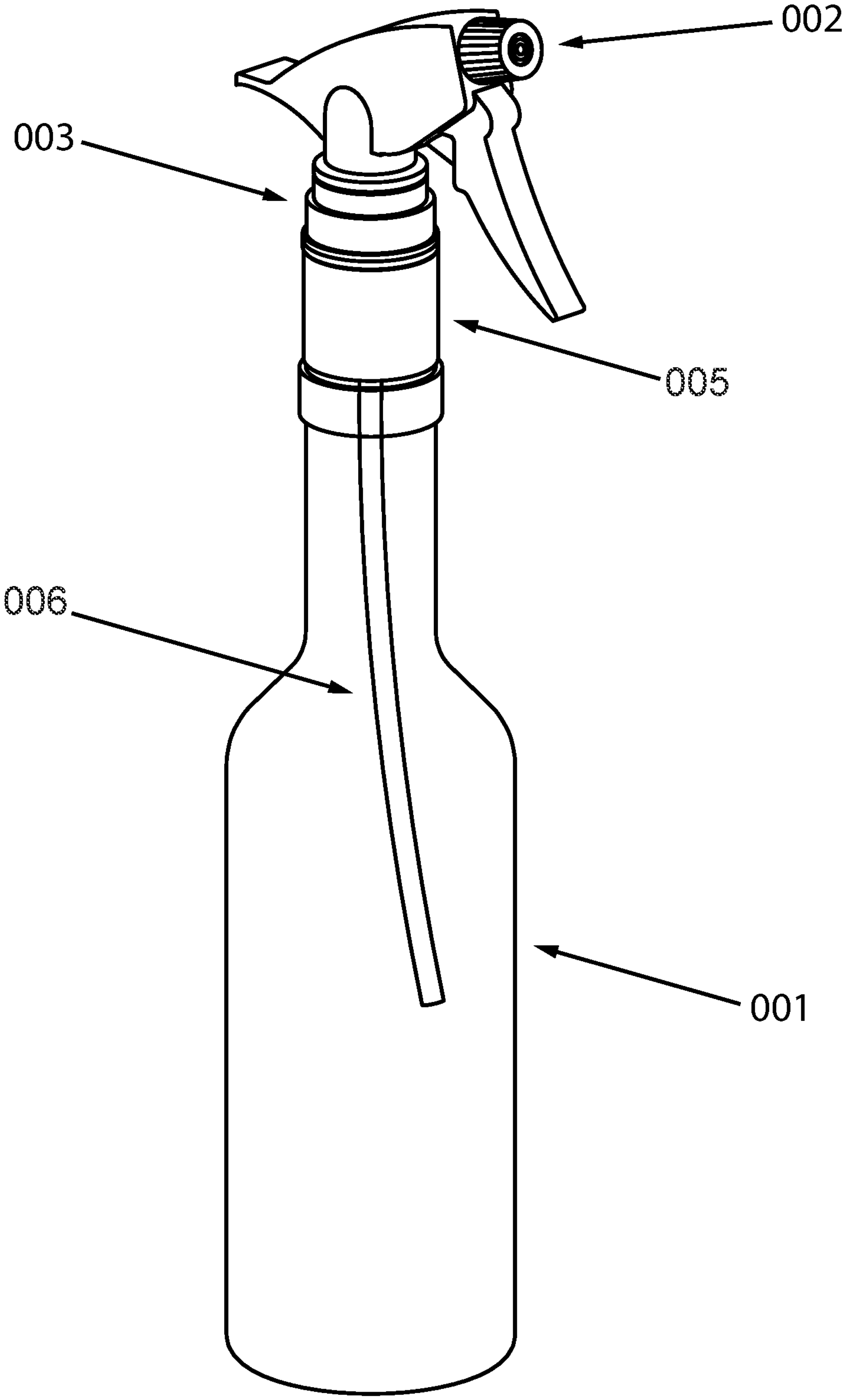
FIG. 2. A perspective view of FIG. 1 with a collar.

FIG. 2. A perspective view of FIG. 1 of an embodiment of a device for dispensing liquids in glass containers inserted in a typical glass container 001 with a collar 005. A sprayer 002 is connected to an adapter 004; a collar is connect to a sprayer 002 and an adapter 004; a dip tube 006 passes through an adapter 004 and is connected to a sprayer 002; a collar 005 is connected to a sprayer 002; an adapter 004 is inserted into the neck of a glass container 001; and a collar 005 is secured to the outside of the neck of a glass container 001.

Figure 3:
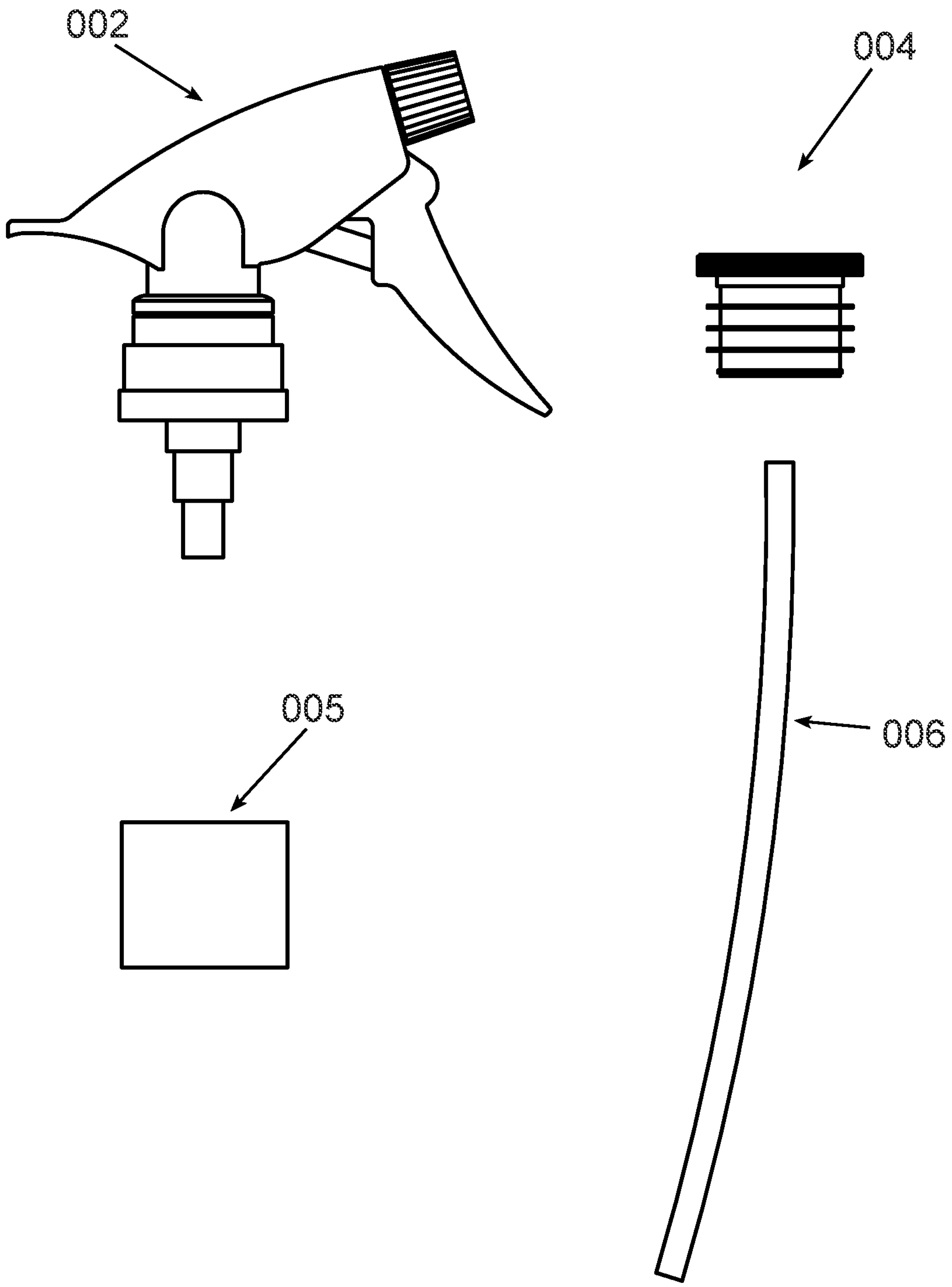
FIG. 3. A side view of an embodiment of a device for dispensing liquids in glass containers showing the unassembled components.

FIG. 3. A side view of an embodiment of a device for dispensing liquids in glass containers comprising the un-assembled components: a sprayer 002 of any type; an adapter 004; a collar 005; a dip tube 006.

Figure 4:
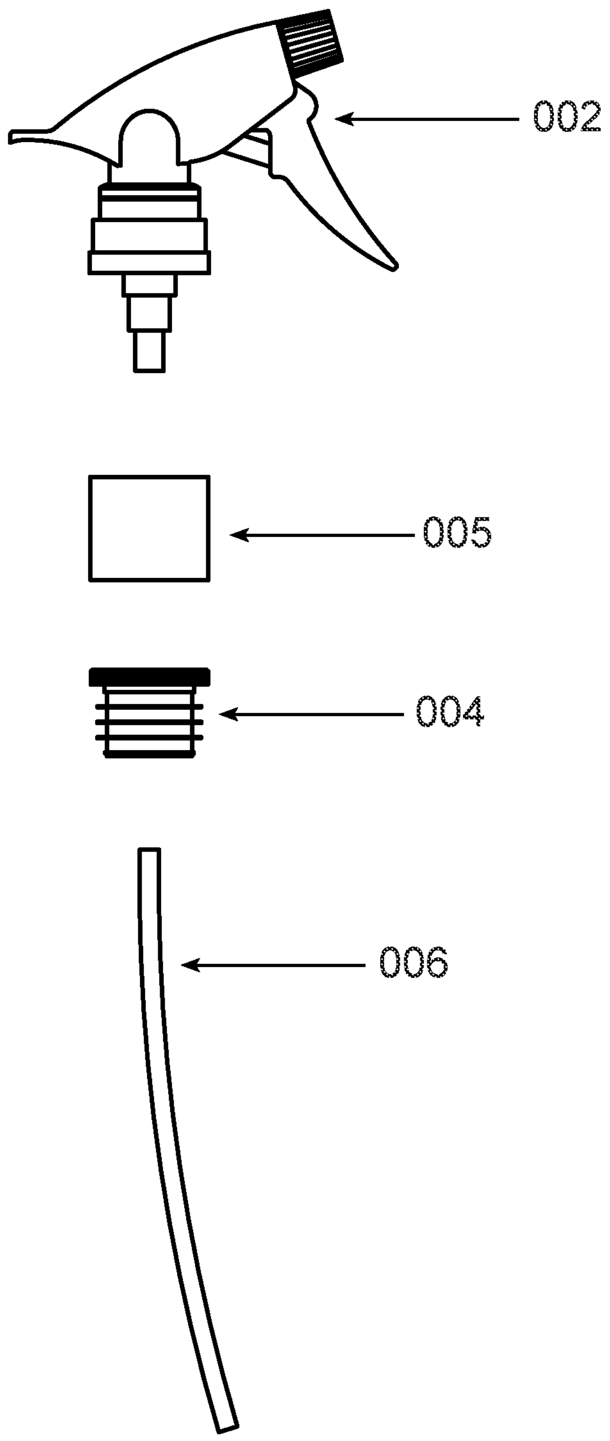
FIG. 4. A side view of an embodiment of a device for dispensing liquids in glass containers showing the unassembled components in the order the components could be connected.

FIG. 4. A side view of an embodiment of a device for dispensing liquids in glass containers showing the un-assembled components in the order the components could be connected, comprising: a sprayer 002 of any type; an adapter 004; a collar 005; a dip tube 006.

Figure 5:
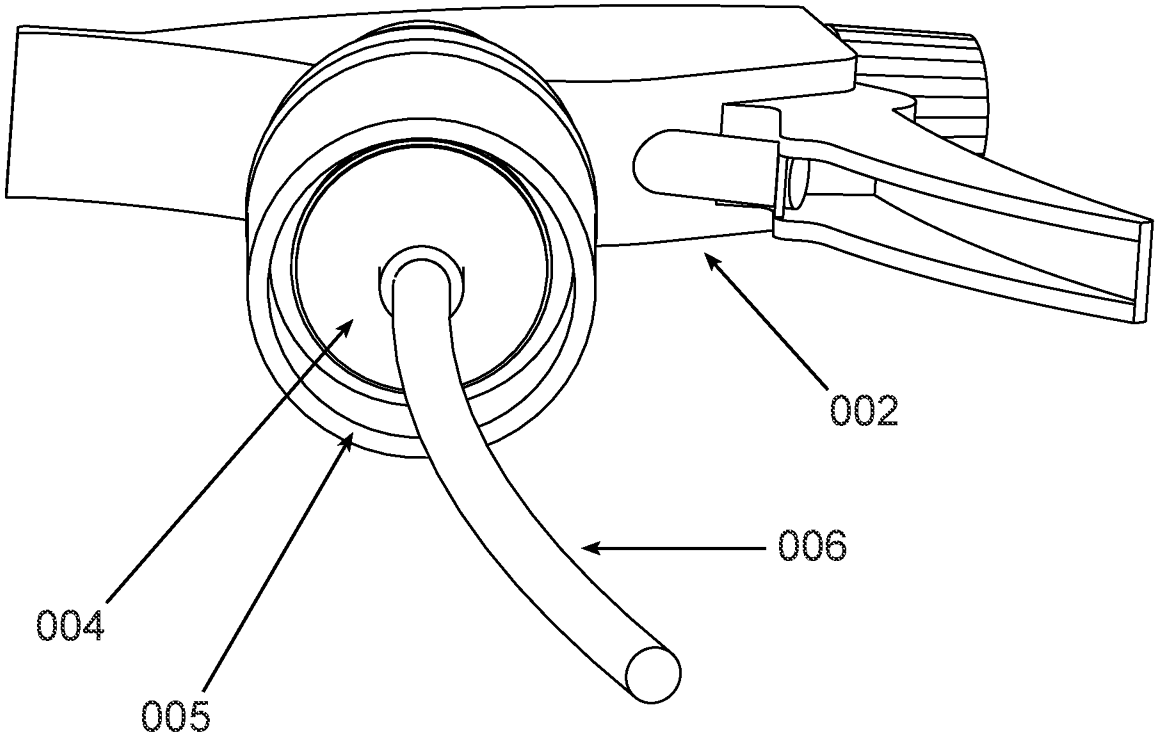
FIG. 5. A bottom view of an embodiment of a device for dispensing liquids in glass containers.

FIG. 5. A bottom view of an embodiment of a device for dispensing liquids in glass containers; a dip tube 006 passes through an adapter 004 to connect to a sprayer 002; a collar 005 is connected to a sprayer and an adapter 004.

Figure 6:
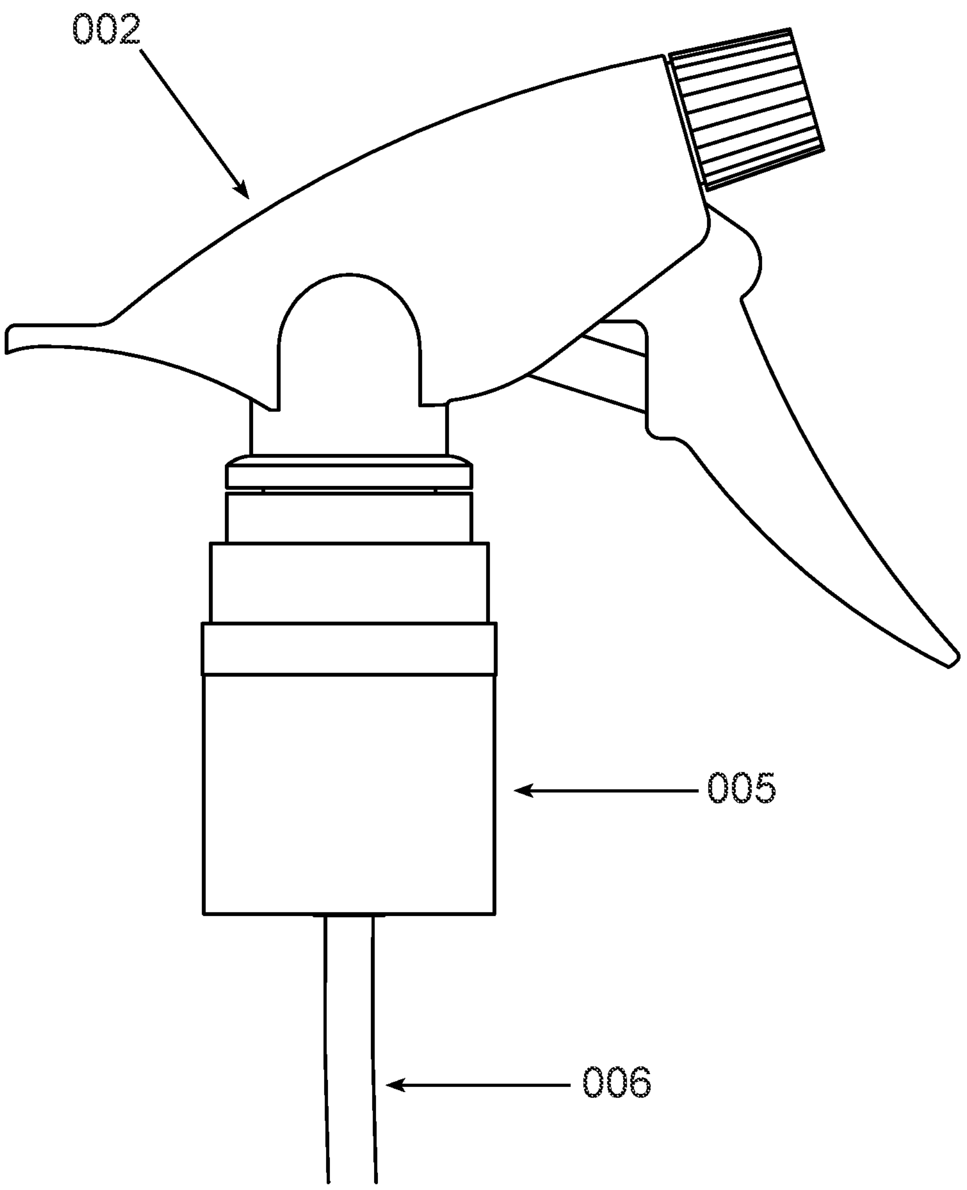
FIG. 6. A side view of an embodiment of a device for dispensing liquids in glass containers with a trigger spray option.

FIG. 6. A side view of an embodiment of a device for dispensing liquids in glass containers with a trigger spray option; a collar 005 is connected to a sprayer 002 and a dip tube 006 passes from the assembly. A sprayer 002 is connected to an adapter 004; a collar is connect to a sprayer 002 and an adapter 004; a dip tube 006 passes through an adapter 004 and is connected to a sprayer 002; a collar 005 is connected to a sprayer 002.

Figure 7:
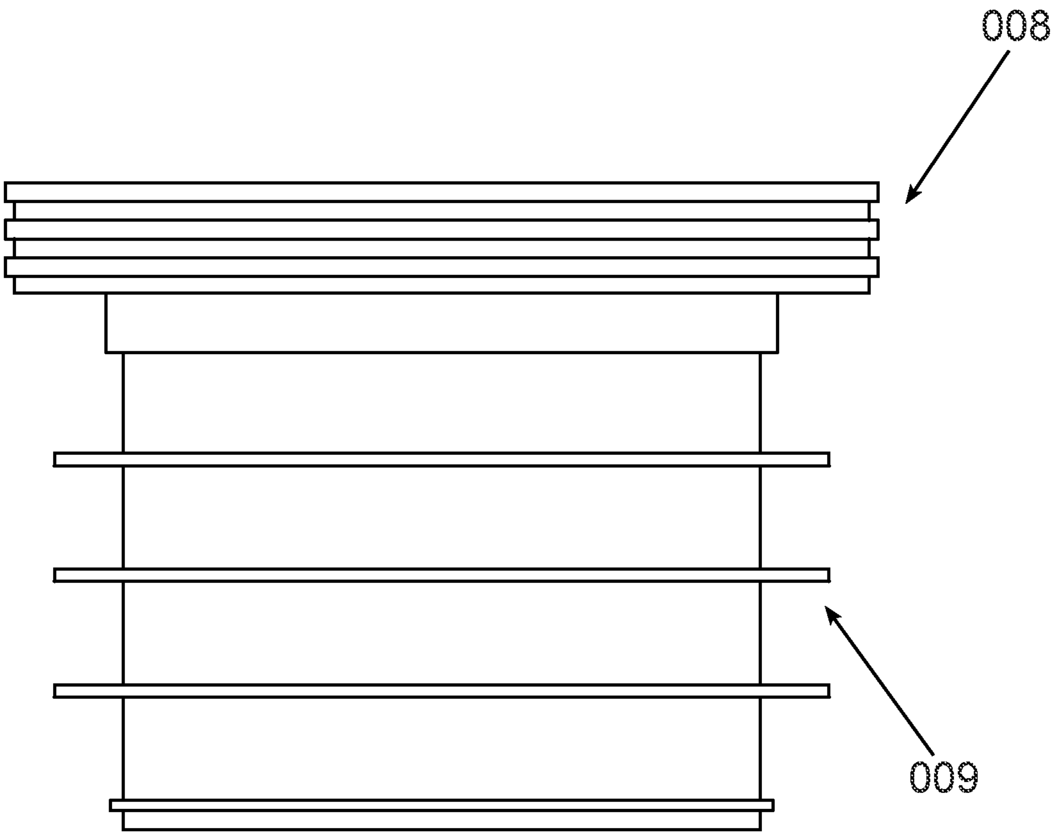
FIG. 7. A side view of an embodiment of a device for dispensing liquids in glass containers showing the adapter only embodiment.

FIG. 7. A side view of an embodiment of a device for dispensing liquids in glass containers showing the adapter only embodiment. A large diameter 008 upper member has threads to connect to the inside of an adaptable sprayer and a smaller diameter 009 lower member has fins or threads to hold an adapter in place.

Figure 8:
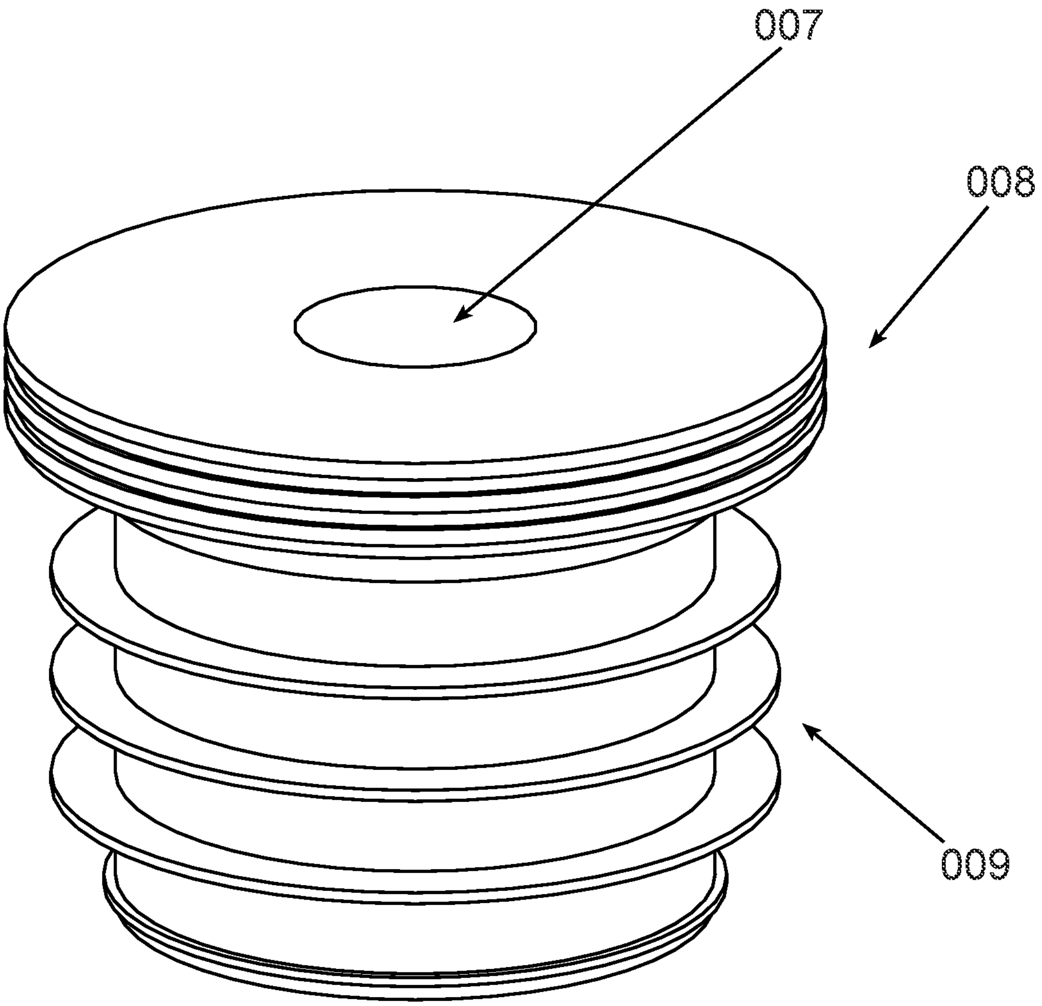
FIG. 8. A perspective view of an embodiment of a device for dispensing liquids in glass containers showing the adapter only embodiment.

FIG. 8. A perspective view of an embodiment of a device for dispensing liquids in glass containers showing the adapter only embodiment. A large diameter 008 upper member has threads to connect to the inside of an adaptable sprayer and a smaller diameter 009 lower member has fins or threads to hold an adapter in place. A hole 007 allows a tube to pass from a sprayer through an adapter.

Figure 9:
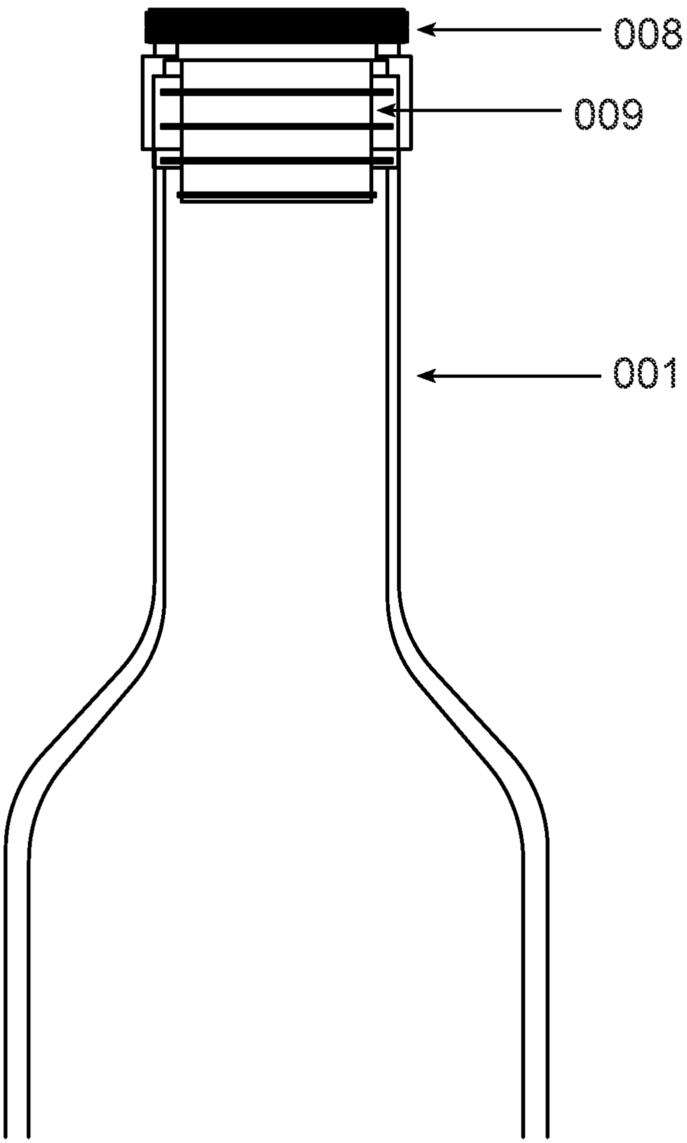
FIG. 9. A side view of an embodiment of a device for dispensing liquids in glass containers showing the adapter only embodiment inserted in a glass container.

FIG. 9. A side view of an embodiment of a device for dispensing liquids in glass containers showing the adapter only embodiment inserted in a typical glass container 001. A large diameter 008 upper member has threads to connect to the inside of an adaptable sprayer and a smaller diameter 009 lower member has fins or threads to hold an adapter in place; an adapter is inserted into a typical glass container 001.

Versions of a device for dispensing liquids in glass containers may be a method of using a glass container with a device for dispensing liquids in glass containers, comprising: selecting a hypothetical glass container 001 appropriate for a device for dispensing liquids in glass containers comprising a spray apparatus 002; an adapter 004; a dip tube 006; and a collar 005.

Another version of a device for dispensing liquids in glass containers may be a method of using a glass container with a device for dispensing liquids in glass containers, comprising selecting a hypothetical glass container 001 appropriate for A device for dispensing liquids in glass containers, an olive oil bottle for example, comprising an adapter 004 inserted into the neck of an olive oil bottle; and threading a selected hypothetical spray adapter to an adapter 004; inserting a dip tube 006 into a spray adapter through a dip tube hole 007 in an adapter 004.

An example of using device for dispensing liquids in glass containers comprises selecting a suitable glass container; inserting an assembled device and system for dispensing liquids in glass containers into a glass container so an adapter 004 is fully inserted and holding device and system for dispensing liquids in glass containers in place; using a spray apparatus 002 to draw liquid through a dip tube 006; dispersing liquid droplets onto the desired surface.

Versions of a device for dispensing liquids in glass containers may be made individually, in batches, or via continuous assembly.

For example, to make a version of a device for dispensing liquids in glass containers prepare an appropriate work surface and assemble all of the components disclosed herein. Assemble the raw materials in a logical order as someone skilled in the art would do. For example, connect a dip tube 006 to the intake side of a sprayer apparatus 002; connect a collar 005 to a sprayer apparatus 002; pass a dip tube 006 through a hole in an adapter 004 and press an adapter 004 into a collar 005.

Different features, variations and multiple different embodiments have been shown and described with various details. What has been described in this application at times in terms of specific embodiments is done for illustrative purposes only and without the intent to limit or suggest that what has been conceived is only one particular embodiment or specific embodiments. It is to be understood that this disclosure is not limited to any single specific embodiments or enumerated variations. Many modifications, variations and other embodiments will come to mind of those skilled in the art, and which are intended to be and are in fact covered by this disclosure. It is indeed intended that the scope of this disclosure should be determined by a proper legal interpretation and construction of the disclosure, including equivalents, as understood by those of skill in the art relying upon the complete disclosure present at the time of filing.

The embodiments of the present invention may be utilized individually, concurrently, or in any sequential combination.

Those skilled in the art to which this application relates will appreciate that other and further additions, deletions, substitutions and modifications may be made to the described embodiments.

The specification is not to be taken in a limiting sense, but is made merely for the purpose of describing the general principles of exemplary embodiments; many additional embodiments of this invention are possible. It is understood that no limitation of the scope of the invention is thereby intended. The scope of the disclosure should be determined with reference to the Claims. Reference throughout this specification to “one embodiment,” “an embodiment,” or similar language means that a particular feature, structure, or characteristic that is described in connection with the embodiment is included in at least one embodiment of the present disclosure. Thus, appearances of the phrases "in one embodiment," "in an embodiment," and similar language throughout this specification may, but do not necessarily, all refer to the same embodiment.

The invention is described with such embodiments, but the invention is not limited to any embodiment. The scope of the invention is limited only by the claims and the invention encompasses numerous alternatives, modifications and equivalents. Several specific details are set forth in the following description to provide a thorough understanding of the invention. These details are provided for the purpose of example and the invention may be practiced according to the claims without some or all of these specific details. In general, the order of the steps of disclosed processes may be altered within the scope of the invention.

Unless otherwise indicated, the drawings are intended to be read (e.g., arrangement of parts, proportion, degree, etc.) together with the specification, and are to be considered a portion of the entire written description of this invention. As used in the following description, the terms "horizontal", "vertical", "left", "right", "up" and "down", as well as adjectival and adverbial derivatives thereof (e.g., "horizontally", "rightwardly", "upwardly", etc.), simply refer to the orientation of the illustrated structure as the particular drawing figure faces the reader. Similarly, the terms "inwardly" and "outwardly" generally refer to the orientation of a surface relative to its axis of elongation, or axis of rotation, as appropriate. Also, as used herein, terms such as "positioned on" or "supported on" mean positioned or supported on but not necessarily in direct contact with the surface.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. The terms "a" or "an" entity refers to one or more of that entity. As such, the terms "a" (or "an"), "one or more" and "at least one" can be used interchangeably herein.

Further, the described features, structures, or characteristics of the present disclosure may be combined in any suitable manner in one or more embodiments. In the Detailed Description, numerous specific details are provided for a thorough understanding of embodiments of the disclosure. One skilled in the relevant art will recognize, however, that the embodiments of the present disclosure can be practiced without one or more of the specific details, or with other methods, components, materials, and so forth. In other instances, well-known structures, materials, or operations are not shown or described in detail to avoid obscuring aspects of the present disclosure. Any alterations and further modifications in the illustrated invention, and such further application of the principles of the invention as illustrated herein, are contemplated as would normally occur to one skilled in the art to which the invention relates.

What is claimed:

1. A device for a dispensing liquids in glass containers, comprising:
- an adapter;
- a collar;
- a sprayer of a given height, length, and width;
- wherein the adapter has an upper member and a lower member;
- wherein the upper member is of a given height and diameter;
- wherein the lower member is of a given height and diameter;
- wherein the diameter of the upper member is greater than the diameter of the lower member;
- wherein the collar is of a given height and inner diameter;
- wherein the upper member comprises a plurality of threads and the lower member comprising a plurality of equidistant fins;
- wherein the collar is connected to the upper member by the plurality of upper member threads;
- wherein the adapter has a cylindrical hole of a given diameter passing through the upper member and the lower member to receive a dip tube and hold the dip tube securely in place; wherein, the dip tube is connected to the sprayer;
- wherein the collar is connected to the sprayer and the upper member;
- wherein an outer edge of each of the fins is flush to into an inner surface of a neck of a glass container; and
- wherein the inner diameter of the collar is of a diameter to be flush to an outer neck of the glass container to hold the collar securely in place.

2. The device for dispensing liquids in glass containers of claim 1 wherein the adapter further comprising: a cylindrical shape.

3. The device for dispensing liquids in glass containers of claim 1 wherein the adapter further comprising the lower member with a shape selected from the group consisting of cylindrical, conical, and tapered.

4. The device for dispensing liquids in glass containers of claim 1 wherein the adapter further comprising the lower member with sides selected from the group consisting of smooth, finned, ridged, flared, and threads.

5. The device for dispensing liquids in glass containers of claim 1 wherein the adapter further comprising being made of materials selected from the group consisting of cork, plastic, silicone, rubber.

6. The device for dispensing liquids in glass containers of claim 1 further comprising:
- the sprayer has a plurality of threads that connect to the upper member plurality of threads to hold the sprayer to the adapter.

7. The device for dispensing liquids in glass containers of claim 1 further comprising a container.

8. The device for dispensing liquids in glass containers of claim 1 further comprising a glass olive oil container of a given height and diameter.

9. The device for dispensing liquids in glass containers of claim 1 wherein the collar further comprising being made of materials selected from the group consisting of plastic, rubber, metal.

10. The device for dispensing liquids in glass containers of claim 1 wherein the collar further comprising an inner diameter material securing the collar to the neck of the container being made of materials selected from the group consisting of plastic, rubber or silicon.

11. A method of using a device and system for dispensing liquids in glass containers, comprising:
- selecting a glass container of a given height and diameter for the device and system for dispensing the liquids in the glass containers;
- selecting a sprayer of a given height, length, and width and dip tube;
- using the device for dispensing the liquids in the glass containers comprising: an adapter; a collar; and the sprayer; wherein the adapter has an upper member and a lower member; wherein the upper member is of a given height and diameter; wherein the lower member is of a given height and diameter; wherein the diameter of the upper member is greater than the diameter of the lower member; wherein the collar is of a given height and inner diameter; wherein the upper member comprises a plurality of threads and the lower member comprising a plurality of equidistant fins; wherein the collar is connected to the upper member by the plurality of upper member threads; wherein the adapter has a cylindrical hole of a given diameter passing through the upper member and the lower member to receive the dip tube and hold the dip tube securely in place; wherein, the dip tube is connected to the sprayer; wherein the collar is connected to the sprayer and the upper member; wherein an outer edge of each of the fins is flush to an inner surface of a neck of a glass container and wherein the inner diameter of the collar is of a diameter to be flush to an outer neck of the glass container to hold the collar securely in place;

wherein the sprayer has a plurality of threads that connect to the upper member plurality of threads to hold the sprayer to the adapter;

attaching the sprayer to the adapter via the plurality of threads; and using the sprayer to spray contents contained in the glass container.

* * * * *